(12) United States Patent
Wilding et al.

(10) Patent No.: US 11,340,083 B2
(45) Date of Patent: May 24, 2022

(54) ASSIGNMENT OF MOTOR VEHICLES TO CHARGING STATIONS

(71) Applicant: Audi AG, Ingolstadt (DE)

(72) Inventors: Werner Wilding, Walting (DE); Jörg Michael, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 120 days.

(21) Appl. No.: 16/088,394

(22) PCT Filed: Apr. 26, 2017

(86) PCT No.: PCT/EP2017/059979
§ 371 (c)(1),
(2) Date: Sep. 25, 2018

(87) PCT Pub. No.: WO2017/191020
PCT Pub. Date: Nov. 9, 2017

(65) Prior Publication Data
US 2019/0202315 A1      Jul. 4, 2019

(30) Foreign Application Priority Data

May 6, 2016    (DE) .................... 10 2016 005 630.4

(51) Int. Cl.
*G01C 21/34*     (2006.01)
*H04W 4/024*     (2018.01)
(Continued)

(52) U.S. Cl.
CPC .......... *G01C 21/3407* (2013.01); *B60L 53/63* (2019.02); *B60L 53/65* (2019.02);
(Continued)

(58) Field of Classification Search
None
See application file for complete search history.

(56) References Cited

U.S. PATENT DOCUMENTS

| 2011/0127944 A1* | 6/2011 | Saito ............... H01M 10/44 320/101 |
| 2011/0221393 A1 | 9/2011 | Billmaier |

(Continued)

FOREIGN PATENT DOCUMENTS

| DE | 19502223 A1 | 8/1996 |
| DE | 102010064015 A1 | 6/2012 |

(Continued)

OTHER PUBLICATIONS

International Preliminary Report on Patentability of the International Searching Authority directed to related International Patent Application No. PCT/EP2017/059979, dated Mar. 28, 2018, with attached English-language translation; 21 pages.

(Continued)

*Primary Examiner* — Tonya Joseph
(74) *Attorney, Agent, or Firm* — Sterne, Kessler, Goldstein & Fox P.L.L.C.

(57) ABSTRACT

A data processing unit comprises a first interface for exchanging first information with at least one motor vehicle and a second interface for exchanging second information with a plurality of charging stations for charging an energy storage device of a first motor vehicle. The first interface is configured to exchange the first information with a plurality of motor vehicles, and the data processing unit is configured, when receiving the first information relating to a charge status at the point in time of a desired charging of the energy storage device and a maximum charging power of the at least one motor vehicle, and the second information relating to a charging power available from at least at one charging station at a predetermined point in time, to create a strategy by which a particular motor vehicle is assigned to a particular charging station for a point in time for charging-start.

20 Claims, 1 Drawing Sheet

(51) Int. Cl.
  *H04W 4/48* (2018.01)
  *B60L 53/66* (2019.01)
  *H04W 4/40* (2018.01)
  *B60L 53/63* (2019.01)
  *B60L 53/65* (2019.01)
  *G06Q 10/02* (2012.01)
  *G06Q 50/06* (2012.01)

(52) U.S. Cl.
  CPC .............. *B60L 53/66* (2019.02); *B60L 53/665* (2019.02); *G06Q 10/02* (2013.01); *G06Q 50/06* (2013.01); *H04W 4/024* (2018.02); *H04W 4/40* (2018.02); *H04W 4/48* (2018.02)

(56) References Cited

U.S. PATENT DOCUMENTS

2011/0246252 A1   10/2011   Uesugi
2013/0069592 A1*  3/2013    Bouman .................. H02J 7/00
                                                  320/109
2013/0151293 A1*  6/2013    Karner ................. G06Q 20/102
                                                  705/5
2013/0261953 A1   10/2013   Kiyama et al.
2015/0286965 A1   10/2015   Amano et al.
2016/0193932 A1*  7/2016    Vaghefinazari ....... H02J 7/0021
                                                  320/109
2016/0364776 A1   12/2016   Khoo et al.

FOREIGN PATENT DOCUMENTS

DE    102012203121 A1    8/2013
EP    2495844 A1         9/2012
EP    2894436 A1         7/2015
WO    WO-2013045449 A2 * 4/2013   .............. B60L 53/14

OTHER PUBLICATIONS

International Search Report and Written Opinion directed to related International Patent Application No. PCT/EP2017/059979, dated Jul. 12, 2017, with attached English-language translation; 29 pages.

* cited by examiner

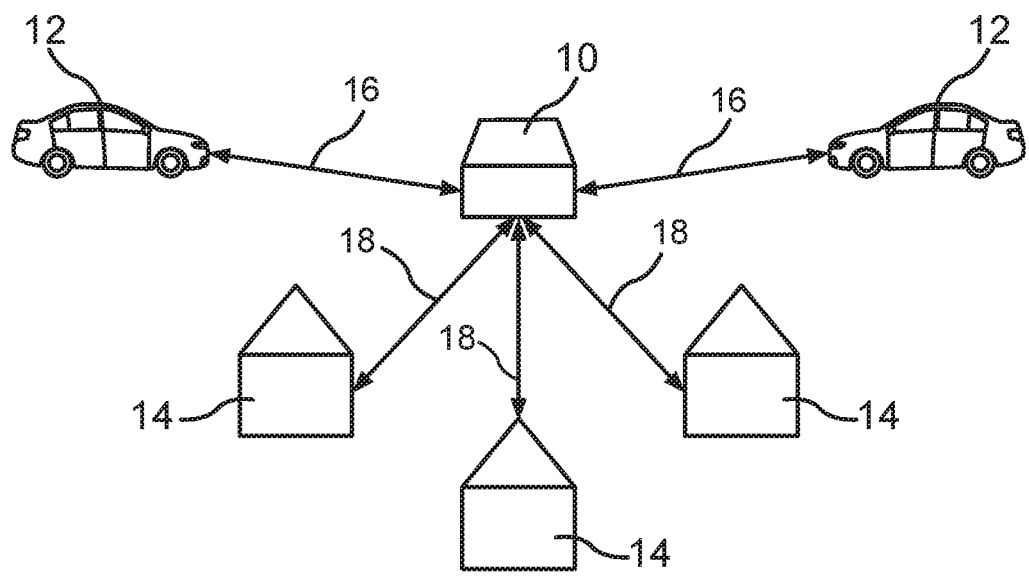

ASSIGNMENT OF MOTOR VEHICLES TO CHARGING STATIONS

TECHNICAL FIELD

This disclosure relates to a data processing unit, which has a first interface for exchanging first information with at least one motor vehicle and a second interface for exchanging second information with a plurality of charging stations for charging the energy storage device of a motor vehicle. Moreover, this disclosure relates to a motor vehicle having an energy storage device and a charging station for charging the energy storage device. Finally, this disclosure relates to a method for operating the data processing unit.

BACKGROUND

Until now, a user of a motor vehicle having an energy storage device, for which charging is desired, independently creates an inquiry about the availability of a particular charging station, which is configured for charging the energy storage device at a self-estimated point in time. The selected charging station can provide information as to whether it is reserved or not at the specified point in time. In addition, it can provide information as to whether it is currently occupied or not. If necessary, with the availability of the selected charging station, the user makes a reservation for a self-estimated charging period of time or creates a request for another charging station. An exact calculation of the total charging duration and thus the necessary charging period of time is done only when charging at a charging station.

A disadvantage for a user of a charging station is the expense and the associated uncertainty of having to contact individual charging stations until there is an available charging station. Furthermore, no accurate prior estimation of the charging duration before charging is possible. Thus, any previous user of the charging station may have misjudged the reserved charging period of time, and waiting times may arise at the charging station for subsequent users. The disadvantages for an operator of a charging station, who may have several charging stations, are the lack of predictability of the power supply system load of his charging stations, and possibly occurring overloads, which can lead to a power failure. Also, the charging stations are not efficiently occupied, through which additional waiting times and costs for operators and users, and possibly detours for the users, may arise.

In this context, DE 195 02 223 A1 describes a battery charging station system for electric vehicles, which comprises a charging station information unit, which detects the occupancy status of each of its registered charging stations. A user can be informed of the occupancy status of the charging station at a desired location and at a desired point in time by a remote inquiry, and if necessary, reserve the charging station for a self-estimated period of time.

From DE 10 2010 064 015 A1, a battery charging station for charging an electric vehicle is known, which has a transmitting-and-receiving device that communicates with the operation unit of the electric vehicle. Furthermore, the battery charging station comprises a control-and-evaluation unit, which is configured to receive a reservation request of the operation unit of the electric vehicle and to determine the availability of the charging station, depending on this reservation request. If necessary, the control-and-evaluation unit makes a reservation at a charging station, or communicates with at least one further charging station using the second reception-and-transmission device, to check its availability and, if necessary, it makes a reservation at this further charging station. Furthermore, the operation unit of the electric vehicle comprises a data processing unit, which selects a battery charging station from a plurality of battery charging stations, depending on a destination, and sends a reservation request to a battery charging station located as close as possible to the destination. The reservation request includes the estimated arrival time of an electric vehicle at the charging station; however, the necessary period of time for charging the electric vehicle is estimated only based on the vehicle type. It is also disadvantageous that the first selected charging station is not always the charging station at which the user could charge his electric vehicle most quickly or most cost-effectively, and that there is no predictability in this respect.

For an alternative embodiment, DE 10 2010 064 015 A1 describes that a reservation request includes the charge status of an electric vehicle, and that the control-and-evaluation unit of a charging station estimates a duration for a charging process. However, DE 10 2010 064 015 A1 does not describe how and based on which parameters such an estimation is made.

In DE 10 2012 203 121 A1, an energy management system is described, which comprises a network for the transmission and distribution of electrical energy, and to which generating facilities and consumer facilities are coupled. The energy management system further comprises a forecasting means, which creates the energy consumption forecast for the consumption facilities. Furthermore, DE 10 2012 203 121 A1 describes that a forecasting means is configured so as to create an energy consumption forecast for a charging station for motor vehicles having a rechargeable energy storage, from the estimated arrival time of the motor vehicles at the charging station and their estimated charge status of their energy storage. The estimated charge status and the estimated arrival time of a vehicle at the charging station can be transmitted to the forecasting means via the positioning system of the vehicle. DE 10 2012 203 121 A1, however, does not deal with a selection of a charging station from a plurality of charging stations, and thus does not deal with the case that there is no availability at a particular charging station at the estimated arrival time of the motor vehicle. A reservation process is also not described.

From US 2013/0261953 A1, a route search system for determining a route between two points is known for an electric vehicle, wherein whether the electric vehicle must be charged along the route is determined. In this case, the route includes a stop-over at a particular charging station.

From EP 2 894 436 A1, a charge-assisting system for an electric vehicle is known, wherein, from a plurality of electric vehicles, electric vehicle information together with the driving status of the electric vehicles are detected. Furthermore, from a plurality of charging stations, charging station information together with the device status and the use status of the electric vehicle are detected. Based on the electric vehicle information, an electric vehicle is known, which must be charged to reach a particular destination from a current location, and based on the charging station information, a particular charging station is selected for the electric vehicle.

From US 2015/0286965 A1, a reservation system is known for reserving a charging station for charging the power source of an electric vehicle. When the battery level of a vehicle falls below the first threshold, a charging station is searched for within the predetermined environment of the current location of the vehicle. A reservation is made via the estimated arrival time at the charging station.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 illustrates a schematic representation of a data processing unit, which communicates, through interfaces, with motor vehicles and charging stations for charging the energy storage devices of motor vehicles, according to some embodiments.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of this disclosure is two-fold. On the one hand, the object is to enable users of motor vehicles having at least one energy storage device to provide a reliable and easier planning for the use of a charging station for charging this energy storage device and to reduce waiting times at the charging station as much as possible. On the other hand, the object is to enable the operators of such charging stations to have the charging stations used as efficiently as possible and to avoid overloading the power supply system.

These objectives are met by a data processing unit, a motor vehicle, a charging station, and a method for operating the data processing unit as disclosed herein.

This disclosure is based on the finding that an improvement in the communication between motor vehicles and charging stations for charging the energy storage device of the motor vehicles leads to an improvement of the charging process for both the user and the operator of the charging station. As disclosed herein, such communication takes place via a data processing unit, which receives, manages, and assesses information from motor vehicles as well as charging stations for charging such motor vehicles. In this case, the data processing unit has a first and a second interface for exchanging a first and a second information, respectively, each interface with one or more motor vehicles and each with one or more charging stations, respectively.

Furthermore, this disclosure is based on the finding that an efficient use and improved planning for the use of a particular charging station occurs when an assignment of a particular motor vehicle, for which charging is desired, to a particular charging station and to a particular point in time for charging-start is carried out using a particular strategy. This strategy uses a total required charging current of at least one motor vehicle and a total available charging power of at least one charging station, and it can carry out the assignment under the consideration of at least one predefinable parameter. This predefinable parameter can be specified by the user of a charging station and by the operator of a charging station.

When receiving the first information, which relates to the charge status at the point in time of the desired charging-start of the energy storage device and the maximum charging power of at least one motor vehicle, and receiving the second information, which relates to the charging power available at least at one charging station at a predetermined point in time, the data processing unit carries out the determination of an appropriate charging station for an appropriate point in time for charging-start.

By such a data processing unit, on a single platform, data from motor vehicles, particularly from the motor vehicles having an energy storage device, and data from charging stations for such motor vehicles, are merged and assessed. Thus, information about the motor vehicles and the charging stations is simultaneously accessible to each user and operator of these motor vehicles and charging stations at any time. An update of the information about both sides is quickly visible to everyone. When compared with the prior art, a larger and clearer choice for a charging station is offered to the user of the charging station, and the operator of a charging station or more charging stations gets an overview of potential customers, which enables him to manage his available charging infrastructure better. On the one hand, the user of a charging station is given the opportunity to determine, based on predefinable parameters he sets, which charging stations may be preferred; on the other hand, there is also a possibility for the operator to get an overview for potential customers and to set predefinable parameters by which one customer may be preferred over others.

The data processing unit creates a strategy, which takes into account the predefinable parameters of the user and the operator of the charging stations, and, using the strategy, creates an automatic assignment of a motor vehicle to a charging station, by which the user saves time in searching for an appropriate charging station. By assigning a motor vehicle with a given charge status and a maximum charging power, the operator of a charging station is informed how much of its available charging power is needed at a given point in time. Through this, the operator can plan his power supply system load at the charging station and operate the charging station, so that the power supply system is kept stable and low-fluctuating.

In an advantageous embodiment, the data processing unit is configured in such a way to determine a charging duration for charging the energy storage device of a particular motor vehicle. The charging duration is determined by assigning a particular motor vehicle to a particular charging station and to a particular point in time for charging-start. This assignment is made using the first and the second information, the first information including the charge status and the maximum charging power of the motor vehicle, and the second information including the available charging power at the charging station at the point in time of charging-start. By knowing the point in time of charging-start and the charging duration of several particular motor vehicles, it is possible to distribute the available charging power at a charging station efficiently over a longer period of time. Charging periods of time may possibly be allocated in such a way that time gaps at the charging station, at which few or no motor vehicles charge, are closed. Also, waiting time at the charging station can be reduced by an accurate knowledge of the charging duration. The user of a charging station can better plan how long he can be away from his motor vehicle during the charging process, to run errands, for example.

In a preferred embodiment of the data processing unit, at least one of the predefinable parameters is formed in such a way that a particular motor vehicle is assigned to a charging station, in which the greatest possible use of the charging power available at the charging station at the point in time of charging-start is carried out. For the user of the charging station, this means that his motor vehicle charges preferably at that charging station, at which the highest charging power is available to him, and thus, at which the shortest charging duration is needed, under the consideration of the maximum charging capacity of his vehicle. For the operator of the charging station, this means that he can ensure the greatest possible benefit of his available charging power. Preferably, the motor vehicle charges at a particular charging station, at which it can utilize most of the available charging power through its maximum charging power. Thus, the operator can sell the greatest possible amount of charging current in a given period of time. The motor vehicle with a lower maximum charging power is assigned to a charging station at which less charging power is available, but which is sufficient for this particular motor vehicle. Thus, even the user of the last charging station can save costs by avoiding using the charging stations with charging plug systems, which are built for high charging power and may be more expensive.

In a further advantageous embodiment, the data processing unit is configured in such a way that, when receiving further information about the current position of a particular motor vehicle and a request for the control of a destination by a positioning system of the motor vehicle, the data processing unit determines the charge status of the motor vehicle along the route between the current position of the motor vehicle and the destination, and determines the point in time for a recommended charging of the energy storage device and the charge status at this point in time. Thereby, the user of a motor vehicle, when searching for an appropriate charging station, no longer has to self-estimate the charge status of the energy storage device of his motor vehicle at the point in time of a possible charging-start. The data processing unit calculates where and at what point in time the level of charge status of the energy storage device of the motor vehicle is, by knowing the traveled distance, and the charge status of the particular motor vehicle at its current geographical position and the geographical position of one or more charging stations along the route. By predefinable parameters, the data processing unit creates a strategy that assigns a motor vehicle to a particular or more a particular charging station along the route. The planning of the total distance to be traveled takes into account the stays at one or more assigned charging stations. The point in time of charging-start at a charging station is accurately calculated. For example, information about the current traffic on the route can be sent to the data processing unit, which includes this information in the determination of the point in time of charging-start and charging period of time, via the positioning system of the motor vehicle. Also, the charging duration can be calculated again when, for example, the point in time of charging-start is shifted due to heavy traffic, and the available charging power changes. Thereby, the operator of the charging station can even better plan when how much of the available charging power and the entire charging current is needed. A further advantage is that a user of the motor vehicle can better plan when he arrives at the destination, in that the motor vehicle's positioning system stays at the charging station. Another advantage for the user of the motor vehicle is the fact that he does not have to plan stays at charging stations in advance and recalculate his arrival time at the destination. This is particularly advantageous for longer route travels, in which it could be necessary, for example, to charge a motor vehicle several times at unknown places. Thus, the user of the motor vehicle can combine driving breaks with stays at the charging stations.

Preferably, the data processing unit is further configured in such a way that it automatically makes a reservation at one of the appropriate charging stations, determined by the strategy, at a determined appropriate point in time for charging-start, for the calculated charging duration, when receiving further information about a request for the control of a destination via the positioning system of a particular motor vehicle.

Thus, the reservation process of the charging station is simplified for the user. For example, the user can set predefinable parameters in advance, by which his motor vehicle is preferably assigned to a particular charging station at a particular charging point in time. The reservation is individually adapted to the wishes of the user.

In a further advantageous embodiment, the data processing unit is configured in such a way that it receives further information about an approval of or a rejection of the assignment of a particular motor vehicle to one of the charging stations and to a particular point in time for charging-start. As a result, an automatic reservation process undesired by the user of the motor vehicle can be avoided.

Preferably, the data processing unit is further configured in such a way that it creates at least one alternative assignment to an alternative charging station and/or an alternative point in time for charging-start for a particular motor vehicle, after receiving a rejection of the assignment. For example, the user himself can select, from a list having several suggestions on charging stations and/or a point in time for charging-start, any suggestion that appeals to him the most. This is particularly advantageous if the user often changes predefinable parameters for creating a strategy for the assignment of a charging station, or if he is indecisive about it.

Preferably, the data processing unit is further configured in such a way that, after receiving approval of the assignment, the data processing unit makes an automatic reservation of the assigned charging station at the assigned point in time of charging-start and of the calculated charging duration for a particular motor vehicle. It is advantageous that no reservation of a charging station takes place, without having received an explicit approval of the user of the motor vehicle. Through this, incorrect reservations can be reduced.

In a further preferred embodiment of the data processing unit, it is configured in such a way that after making a reservation of a particular charging station for at least one motor vehicle, the data processing unit calculates again the available charging power at the charging station at a predetermined point in time. This ensures that changes in the available charging powers are continuously updated and other potential users of the charging station are promptly informed. Thus, the overlapping reservations of the charging station can be avoided. The operator of the charging station is also informed about the necessary charging power at a given point in time at the charging station.

The disclosed motor vehicle comprises an energy storage device and an interface for exchanging information with the above-described data processing unit. The interface is configured to send information about the current charge status of the energy storage device and the maximum charging power of the motor vehicle. The motor vehicle is configured in such a way that it provides the user with an opportunity to approve or reject the assignment when receiving an assignment to a charging station and to a point in time for charging-start.

Preferably, the motor vehicle comprises a positioning system, which is configured in such a way that it exchanges information with the interface, and the interface is configured to send information about the position of the motor vehicle and the control of a destination to the data processing unit.

The disclosed charging station for charging the energy storage device of a motor vehicle comprises an interface for exchanging information with the above-described data processing unit. The interface is configured to send information about an available charging power at a predetermined point in time.

The advantages and developments, described above in the context of the data processing unit, apply to the motor vehicle and the charging station.

The disclosed method for operating a data processing unit, which exchanges the first information with at least one motor vehicle using the first interface and the second information with a plurality of charging stations for charging the energy storage device of a motor vehicle using the second interface, includes the detection of the charge status at a point in time for a desired charging-start of the energy storage device of at least one particular motor vehicle, in the first step. In the second step, an available charging power at the point in time of a desired charging-start of a particular motor vehicle at least at one charging station is determined. In the final step, a strategy is created, by which a particular motor vehicle is assigned to a particular charging station at a particular point in time for charging-start, under the consideration of at least one predefinable parameter.

The advantages and developments, described above in the context of the data processing unit, apply to the method for operating such a data processing unit.

The disclosed system comprises a data processing unit, at least one motor vehicle, and at least one charging station, wherein the data processing unit has a first interface, through which a first information is exchanged with the motor vehicle, which also has a corresponding interface for communication. Furthermore, the data processing unit comprises a second interface, through which a second information is exchanged with a charging station. In this case, the first information includes the current charge status of the power storage device of a particular motor vehicle and the maximum charging power of that power storage device. The second information comprises an available charging power of a particular charging station at a predetermined point in time. The data processing unit is configured to create a strategy, when receiving the first and the second information, by which a particular motor vehicle is assigned to a particular charging station at a particular point in time for charging-start, under the consideration of at least one predefinable parameter.

The advantages and further developments described above in the context of the data processing unit, the motor vehicle, and the charging station apply to the system having a data processing unit, at least one motor vehicle, and at least one charging station.

The disclosed devices, system, and method will now be explained with reference to the accompanying drawings.

FIG. 1 shows a schematic representation of a data processing unit, which communicates, through interfaces, with motor vehicles and charging stations for charging the energy storage devices of motor vehicles, according to some embodiments.

The embodiments described in more detail below represent preferred embodiments of this disclosure.

FIG. 1, a data processing unit 10 is shown schematically. This exchanges first information, via a first interface 16, with at least one of two motor vehicles 12, for example, each motor vehicle 12 having an energy storage device (not shown). This information includes a point in time for a desired charging of the energy storage device of the motor vehicle 12 and a charge status at this point in time. Furthermore, this information includes the maximum possible charging power of the motor vehicle 12. For example, this information may manually be entered by a user of the motor vehicle 12, and be sent, via the first interface 16, to the data processing unit 10. But, the information may also be automatically sent via an on-board device (not shown) of the motor vehicle 12, which communicates with the energy storage device, and via the first interface 16 to the data processing unit 10. Also, for example, the motor vehicle 12 can have a positioning system (not shown) that exchanges information, via the first interface 16, with the data processing unit 10. For example, the positioning system in the motor vehicle 12 can be installed even in an on-board device (not shown), or be configured as a portable navigation device, or as a built-in navigation device in a mobile phone, for example. The positioning system sends information about the current position of the motor vehicle 12, a controlled destination, and a selected route between the current position and the destination. The data processing unit 10 determines, when receiving this information, the charge status of the motor vehicle 12 along the route and the time duration of possibly required charging.

More information can be sent, via the first interface 16, to the data processing unit 10 for an assessment. For example, the data processing unit 10 receives information about the technical features of a motor vehicle 12, such as the existing charging plug system, an existing possibility of an inductive charging of the motor vehicle 12, or an average energy consumption per driven distance section. A particular motor vehicle 12 can be allocated to a particular customer profile, which stores the above-mentioned features of the motor vehicle 12 and has other details, such as a desired payment model, a desired operator of a charging station 14, and the number of accumulated points in the context of a regular customer reward model, for example. Furthermore, the user can specify to what extent he would like to charge the energy storage device of his motor vehicle 12 or to which charge status he would like to charge.

The data processing unit 10 exchanges second information, via a second interface 18, with one or more charging stations 14. Charging stations 14 can be built in the form of parking garages, for example. Three charging stations 14 are shown in FIG. 1. There is a possibility to charge the energy storage device of a motor vehicle 12 at a charging station 14. For example, an operator has several charging stations 14 within one or more parking garages. The charging stations 14 of the operator exchange information about their available charging power at a predetermined point in time, via the second interface 18. Furthermore, for example, information about available charging plug systems, the availability of inductive charging parking lots, or the price level of charging current at various charging stations 14, can be sent to the data processing unit 10.

When receiving the first and the second information, the data processing unit 10 creates a strategy, which assigns a particular motor vehicle 12 to a particular charging station 14 at a given point in time for charging-start under the consideration of predefinable parameters.

These parameters can specify a user of a motor vehicle 12 and also an operator of a charging station 14. For example, a user may specify a time frame, within which he wants to charge his motor vehicle 12. Furthermore, he can adjust, for example, the maximum deviation of his route to be traveled to reach the charging station 14 or the maximum price he is willing to pay for charging current. Furthermore, the operator of the charging station 14 may specify at what point in time he wants to make an amount of charging current available and which maximum charging power his charging station 14 has. This is considered by the strategy of the data processing unit 10 to avoid overloading the power system (not shown) of the charging station 14. Furthermore, the operator can specify how to efficiently distribute the assignment of the motor vehicles 12 over the available charging stations 14 and, thus, can avoid temporal gaps as much as possible. Also, he can give a particular customer profile priority, for example, because the particular customer can recharge more current within a particular period of time with his energy storage device having a larger maximum charging power than another customer with an energy storage device having a lower charging power.

The data processing unit 10 checks the compatibility of the predefinable parameters of both sides of the user and the operator, and creates the assignment. The reservation of a particular charging station 14 can be automatically made by the data processing unit 10 and communicated to the user via the first interface 16. For example, the navigation system of the motor vehicle 12 can automatically control a stay at the reserved charging station 14, and schedule this stay by calculating the arrival at the destination. But, the reservation of a particular charging station 14 can also be made, for example, if the user accepts the assignment. Otherwise, the user may be provided with at least one alternative or a list of alternatives, wherein the user selects an alternative charging station 14 and/or an alternative point in time for charging-start. After reserving a particular charging station 14 at a point in time for charging-start, and after the charging duration is calculated by the data processing unit 10, the remaining available charging power at the charging station 14, after the deduction of the necessary charging power for charging the energy storage device of the reserved motor vehicle 12, is determined and updated.

The invention claimed is:

1. A data processing unit, comprising:
   a memory;
   at least one processor coupled to the memory;
   a first data interface for exchanging first information with a plurality of motor vehicles; and
   a second data interface for exchanging second information with a plurality of charging stations for charging an energy storage device of a motor vehicle of the plurality of motor vehicles,
   wherein the data processing unit is configured to:
   determine, from the motor vehicle, a point in time for charging-start of the energy storage device using at least one predefinable parameter;
   receive, from the motor vehicle, the first information, including a charge status at the point in time of the charging-start of the energy storage device and a maximum charging power of the motor vehicle;
   receive, from a charging station of the plurality of charging stations, the second information, including an available charging power of the charging station at the point in time of the charging-start;
   create a strategy for assignment of the motor vehicle to the charging station of the plurality of the charging stations; and
   assign the motor vehicle to the charging station,
   wherein the at least one predefinable parameter is configured for the assignment of the motor vehicle to the charging station such that a greatest possible utilization of the available charging power of the charging station is achieved at the point in time of the charging-start.

2. The data processing unit of claim 1, wherein the data processing unit is further configured to:
   determine a charging duration for charging the energy storage device of the motor vehicle from the point in time of the charging-start after assigning the motor vehicle to the charging station.

3. The data processing unit of claim 2, wherein the data processing unit is further configured to:
   receive, from a positioning system of the motor vehicle over the first data interface, a current position of the motor vehicle;
   receive, from the positioning system of the motor vehicle over the first data interface, a request for control of a destination of the motor vehicle;
   determine the charge status of the motor vehicle along a route between the current position and the destination; and
   determine, as part of the strategy, a recommended point in time for a recommended charging-start of the energy storage device and an estimated charge status at the recommended point in time.

4. The data processing unit of claim 3, wherein the data processing unit is further configured to:
   automatically reserve the charging station of the plurality of charging stations determined by the strategy, at the recommended point in time for the recommended charging-start, and for the charging duration.

5. The data processing unit of claim 1, wherein the data processing unit is further configured to:
   receive, over the first data interface from a user of the motor vehicle, an approval or a rejection of the assignment of the motor vehicle to the charging station for the point in time of the charging-start.

6. The data processing unit of claim 5, wherein the data processing unit is further configured to:
   after receiving the rejection of the assignment, create at least one alternative assignment to an alternative charging station or at an alternative point in time for the charging-start of the motor vehicle.

7. The data processing unit of claim 5, wherein the data processing unit is further configured to:
   after receiving the approval of the assignment, automatically reserve the charging station at the point in time of the charging-start and for a charging duration for charging the energy storage device of the motor vehicle from the point in time of the charging-start.

8. The data processing unit of claim 7, wherein the data processing unit is further configured to:
   after reserving the charging station for the motor vehicle, calculate a remaining available charging power at the charging station for a predetermined point in time, comprising at least an end point in time of the charging duration.

9. A method for operating a data processing unit, which exchanges first information with a plurality of motor vehicles using a first data interface and second information with a plurality of charging stations using a second data interface, for charging an energy storage device of a motor vehicle of the plurality of motor vehicles, the method comprising:
   detecting a charge status at a point in time of charging-start of the energy storage device of the motor vehicle of the plurality of motor vehicles;

detecting a maximum charging power of the motor vehicle;
determining an available charging power at the point in time of the charging-start of the motor vehicle of at least one charging station of the plurality of charging stations;
creating a strategy for assigning the motor vehicle to the at least one charging station of the plurality of the charging stations to satisfy the point in time for the charging-start, using at least one predefinable parameter; and
assigning the motor vehicle to the at least one charging station,
wherein the at least one predefinable parameter is configured to achieve a greatest possible utilization of the available charging power of the at least one charging station at the point in time of the charging-start.

10. The method of claim 9, further comprising:
determining a charging duration for charging the energy storage device of the motor vehicle from the point in time of the charging-start after assigning the motor vehicle to the at least one charging station.

11. The method of claim 10, further comprising:
receiving, from a positioning system of the motor vehicle over the first data interface, a current position of the motor vehicle;
receiving, from the positioning system of the motor vehicle over the first data interface, a request for control of a destination of the motor vehicle;
determining the charge status of the motor vehicle along a route between the current position and the destination;
determining a recommended point in time for a recommended charging-start of the energy storage device and an estimated charge status at the recommended point in time; and
automatically reserving the at least one charging station of the plurality of charging stations determined by the strategy, at the recommended point in time for the recommended charging-start, and for the charging duration.

12. The method of claim 9, further comprising:
receiving, over the first data interface from a user of the motor vehicle, an approval or a rejection of the assignment of the motor vehicle to the at least one charging station for the point in time of the charging-start.

13. The method of claim 12, further comprising:
after receiving the rejection of the assignment, creating at least one alternative assignment to an alternative charging station or at an alternative point in time of the charging-start of the motor vehicle.

14. The method of claim 12, further comprising:
after receiving the approval of the assignment, automatically reserving the at least one charging station at the point in time of the charging-start and for a charging duration for charging the energy storage device of the motor vehicle from the point in time of the charging-start.

15. The method of claim 14, further comprising:
after reserving the at least one charging station for the motor vehicle, calculating a remaining available charging power of the at least one charging station for a predetermined point in time, comprising at least an end point in time of the charging duration.

16. A system, comprising:
a data processing unit, comprising:
a memory; and
at least one processor coupled to the memory;
a first data interface for exchanging first information between at least one motor vehicle and the data processing unit,
wherein the first data interface is configured to transfer the first information comprising a current charge status of an energy storage device of a first motor vehicle of the at least one motor vehicle and a maximum charging power of the first motor vehicle; and
a second data interface for exchanging second information between at least one charging station and the data processing unit,
wherein the second data interface is configured to transfer the second information comprising an available charging power of a first charging station of the at least one charging station at a predetermined point in time for charging the energy storage device of the first motor vehicle;
wherein the at least one processor is configured to:
detect the current charge status at a point in time of charging-start of the energy storage device of the first motor vehicle;
detect the maximum charging power of the first motor vehicle;
determine the available charging power at the point in time of the charging-start of the first charging station;
create a strategy for assigning the first motor vehicle of the at least one motor vehicle to the first charging station of the at least one charging station of the plurality of the charging stations to satisfy the charging-start of the first motor vehicle, using at least one predefinable parameter,
wherein, using the at least one predefinable parameter, the at least one processor is further configured to:
achieve a greatest possible utilization of the available charging power of the at least one charging station at the point in time of the charging-start of the first motor vehicle;
assign the first motor vehicle to the first charging station;
determine a charging duration for charging the energy storage device of the first motor vehicle from the point in time of the charging-start after assigning the first motor vehicle to the first charging station;
receive, over the first data interface, an approval or a rejection of the assignment of the first motor vehicle to the first charging station for the point in time of the charging-start;
after receiving the rejection of the assignment, create at least one alternative assignment to a second charging station of the at least one charging station or at an alternative point in time of the charging-start of the first motor vehicle;
after receiving the approval of the assignment, automatically reserve the first charging station at the point in time of the charging-start and for the charging duration for charging the energy storage device of the first motor vehicle from the point in time of the charging-start; and
after reserving the first charging station for the first motor vehicle, calculate a remaining available charging power of the first charging station for a predetermined point in time, comprising at least an end point in time of the charging duration.

17. The system of claim 16, wherein the at least one processor is further configured to:
- receive, from a positioning system of the first motor vehicle, over the first data interface, a current position of the first motor vehicle and control information for a destination of the first motor vehicle.

18. The system of claim 17, wherein the at least one processor is further configured to:
- determine the current charge status of the first motor vehicle along a route between the current position and the destination;
- determine a recommended point in time for a recommended charging-start of the energy storage device and an estimated charge status at the recommended point in time; and
- automatically reserve the first charging station of the at least one charging station determined by the strategy, at the recommended point in time for the recommended charging-start, and for the charging duration.

19. The data processing unit of claim 1, wherein creating the strategy for assignment of the motor vehicle to the at least one charging station is based on a route deviation parameter.

20. The method of claim 9, wherein creating the strategy for assignment of the motor vehicle to the at least one charging station is based on a route deviation parameter.

* * * * *